United States Patent [19]
Kajino

[11] Patent Number: 5,734,465
[45] Date of Patent: Mar. 31, 1998

[54] LENS METER FOR MEASURING A SHAPE OF A PROGRESSIVE SECTION

[75] Inventor: Tadashi Kajino, Okazaki, Japan

[73] Assignee: Nidek Co., Ltd., Aichi, Japan

[21] Appl. No.: 684,693

[22] Filed: Jul. 22, 1996

[30] Foreign Application Priority Data

Jul. 31, 1995 [JP] Japan ................................. 7-215431
Jul. 31, 1995 [JP] Japan ................................. 7-215432

[51] Int. Cl.⁶ ................................................ G01B 9/00
[52] U.S. Cl. ............................................................ 356/124
[58] Field of Search ............................... 356/124–127

[56] References Cited

U.S. PATENT DOCUMENTS

| | | | |
|---|---|---|---|
| 4,730,924 | 3/1988 | Allard et al. | 356/125 |
| 4,826,315 | 5/1989 | Kohayakawa | 356/127 |
| 5,173,739 | 12/1992 | Kurachi et al. | 356/124 |
| 5,247,341 | 9/1993 | Kurachi et al. | 356/125 |
| 5,349,433 | 9/1994 | Iwane | 356/124 |
| 5,379,111 | 1/1995 | Kajino et al. | 356/124 |
| 5,521,700 | 5/1996 | Kajino et al. | 356/124 |

FOREIGN PATENT DOCUMENTS

| | | |
|---|---|---|
| A-60-17335 | 1/1985 | Japan . |
| A-6-160239 | 6/1994 | Japan . |

Primary Examiner—Frank G. Font
Assistant Examiner—Amanda Merlino
Attorney, Agent, or Firm—Oliff & Berridge, P.L.C.

[57] ABSTRACT

A lens meter in which a measuring light flux is projected against a lens to be examined and the optical characteristics of the examined lens are measured in reference to the position of an image formed on a light receiving element by the measuring light flux passed through the examined lens is comprised of a mode changing-over device changing-over to a mode for measuring an additive diopter of a progressive focus lens, a measuring device for continuously measuring a refractive power of the examined lens, a reference position setting device for sensing a position having a predetermined optical characteristics of the progressive multifocus lens and defining a reference position of the examined lens, a displacement sensing device for sensing a displacement position of a measuring point from the reference position, and a displaying device for displaying the displacement sensed by the displacement sensing device. In addition, there are a provided lateral displacement sensing device for sensing a lateral displacement of a measuring point of the examined lens, a sensing device for sensing the right and left ends of a progressive section of the progressive focus lens, and a progressive section displaying device for displaying the progressive section in response to the results obtained by the sensing device and the lateral displacement sensing device.

16 Claims, 6 Drawing Sheets

LENS METER FOR MEASURING A SHAPE OF A PROGRESSIVE SECTION

BACKGROUND OF THE INVENTION

1. Field of the Invention

The present invention relates to a lens meter for use in measuring the optical characteristics of a lens, and more particularly a lens meter which is suitable for measuring a progressive focus lens.

2. Description of the Related Art

It is known that an accommodation power of human eyes is gradually decreased as an age of a person is increased and then it becomes impossible to focus a focal point to a near distance. As the accommodation power is decreased, it becomes necessary to prepare spectacles for use in correcting the refractive power for the near viewing. As a lens for eliminating inconvenience found in the near viewing, it has been most widely spread in recent years to provide a progressive focus lens having no interface line ranging from the far viewing section to the near viewing section.

As a lens meter for measuring the characteristics of the refractive power of a lens to be examined, it is well known to provide such a lens meter as one in which a measuring light flux is projected against the examined lens, a locus of measuring light passed through the examined lens is detected by a light receiving element and then the optical characteristics of the examined lens can be obtained in response to the result of detection. This lens meter has an additive diopter measuring mode so as to measure the additive diopter of a progressive multifocus lens and the like.

In the case that the additive diopter is to be measured, the examined lens is moved in respect to the measuring optical axis and at first the far viewing section is measured and stored. After this operation, the lens is moved along the progressive section and a position where the operator judges to approach the near viewing section is measured and stored. The additive diopter is calculated in reference to the difference between the measured values.

The lens not processed before being mounted into a frame is normally applied with marks or concealed marks indicating the respective positions of the far viewing section and the near viewing section. When the marks indicating the respective positions of the far viewing section and the near viewing section are searched to follow, a relative accurate measurement can be performed. In addition, it is also possible to know by the concealed marks the optical characteristics or types of the progressive focal lens in compliance with data provided by lens manufacturers.

However, it is frequently found that the marks attached to the non-framed lens easily fade out and in turn in the case of the framed lens, the marks indicating the respective positions of the far viewing section and the near viewing section are wiped off for cleaning, resulting in that the concealed marks are difficult to recognize visually. Accordingly, in order to perform an accurate measurement of the additive diopter, the operator is required to have a substantial skill for operation.

In addition, in order to provide an appropriate progressive focus lens to a user, it is important not only to get an accurate additive diopter but also to get the optical characteristics at the progressive section such as a distance ranging from the starting position of the additive diopter to the near viewing section and the like. In the case that a user prefers to see through the intermediate section in the lens, for example, it is frequently found that the user prefers to use such a lens as one in which the position of the near viewing section measured from the additive diopter starting position is set to be relatively long distance (the lens in which the near viewing section is placed at a lower segment). In turn, in the case that a user prefers to see through the near viewing section in the lens, it is occasionally found that the user desires to use such a lens as one in which the position of the near viewing section measured from the additive diopter starting position is set to be relatively short.

Additionally, the optical design for the progressive focus lens has its specific feature and in the case that an examined person wears lenses of different optical designs, the person gets a quite different feeling at the eyes. Due to this fact, in the case that spectacles are newly made, it may become a quite important information to know what type of lens of optical design the examined person wore in the past. However, the progressive focus lens has a consecutive varying refractive power ranging from the far viewing section to the near viewing section and the width of the progressive section, a distributing state of the refractive power or the like may not be understood through bare eyes. Although the non-framed progressive focus lens has some marks at each of the positions in the far viewing section and the near viewing section, the width of the progressive section or the like may not be understood. Accordingly, it could not be said that the mere measurement of the additive diopter as found in the conventional lens meter provides the sufficient common data when the user selects progressive focus lenses.

SUMMARY OF THE INVENTION

The present invention has been made in view of the above circumstances and has an object to overcome the above problems and to provide, as its technical issue, a lens meter capable of informing precisely the optical characteristics of a progressive focus lens.

It is another object of the present invention to provide, as its technical issue, a lens meter capable of measuring multiple optical characteristics of a progressive focus lens such as the width of a progressive section as well as an additive diopter.

Additional objects and advantages of the invention will be set forth in part in the description, which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a lens meter of this invention in which a measuring light flux is projected against a lens to be examined and the optical characteristics of the examined lens are measured in reference to the position of an image formed on a light receiving element by the measuring light flux passed through the examined lens, comprises mode changing-over means changing-over to a mode for measuring an additive diopter of a progressive focus lens, measuring means for continuously measuring a refractive power of the examined lens, reference position setting means for sensing a position having a predetermined optical characteristic of the progressive focus lens and defining a reference position of the examined lens, displacement sensing means for sensing a displacement of a measuring point from the reference position, and displaying means for displaying the displacement sensed by the displacement sensing means.

Another aspect of this invention in which a measuring light flux is projected against a lens to be examined and the optical characteristics of the examined lens are measured in reference to the position of an image formed on a light receiving element by the measuring light flux passed through the examined lens, comprises measuring mode changing-over means changing-over to a mode for measuring an additive diopter of a progressive focus lens, measuring control means for continuously measuring, refractive power of the examined lens in a predetermined interval a lateral displacement sensing means for sensing a lateral displacement of a measuring point of the examined lens, sensing means for sensing the right and left ends of a progressive section of the progressive focus lens, and progressive section displaying means for displaying the progressive section in response to the results obtained by the sensing means and the lateral displacement sensing means.

According to the present invention, it is possible to know the more detailed optical characteristics of the progressive focus lens. Thus, it is possible to select the type of the progressive focus lens in compliance with a state of use or to perform an easy selection of such a lens as one which is similar to a conventional type of a lens.

In addition, in accordance with the present invention, it is possible to perform a precise measurement of not only the additive diopter of the progressive focus lens but also the width of the progressive section at any optional position. Further, its optical characteristics can be known in view of many ways by displaying the distributed state of the progressive section. Accordingly, it becomes possible to select or provide a progressive focus lens suitable for a user in the case that a lens type in compliance with a state of use of the user and one which is similar to the lens type used in the past are to be selected.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

DETAILED DESCRIPTION OF THE PREFERRED EMBODIMENTS

A detailed description of one preferred embodiment of the present invention will now be given referring to the accompanying drawings.

Figure 1:
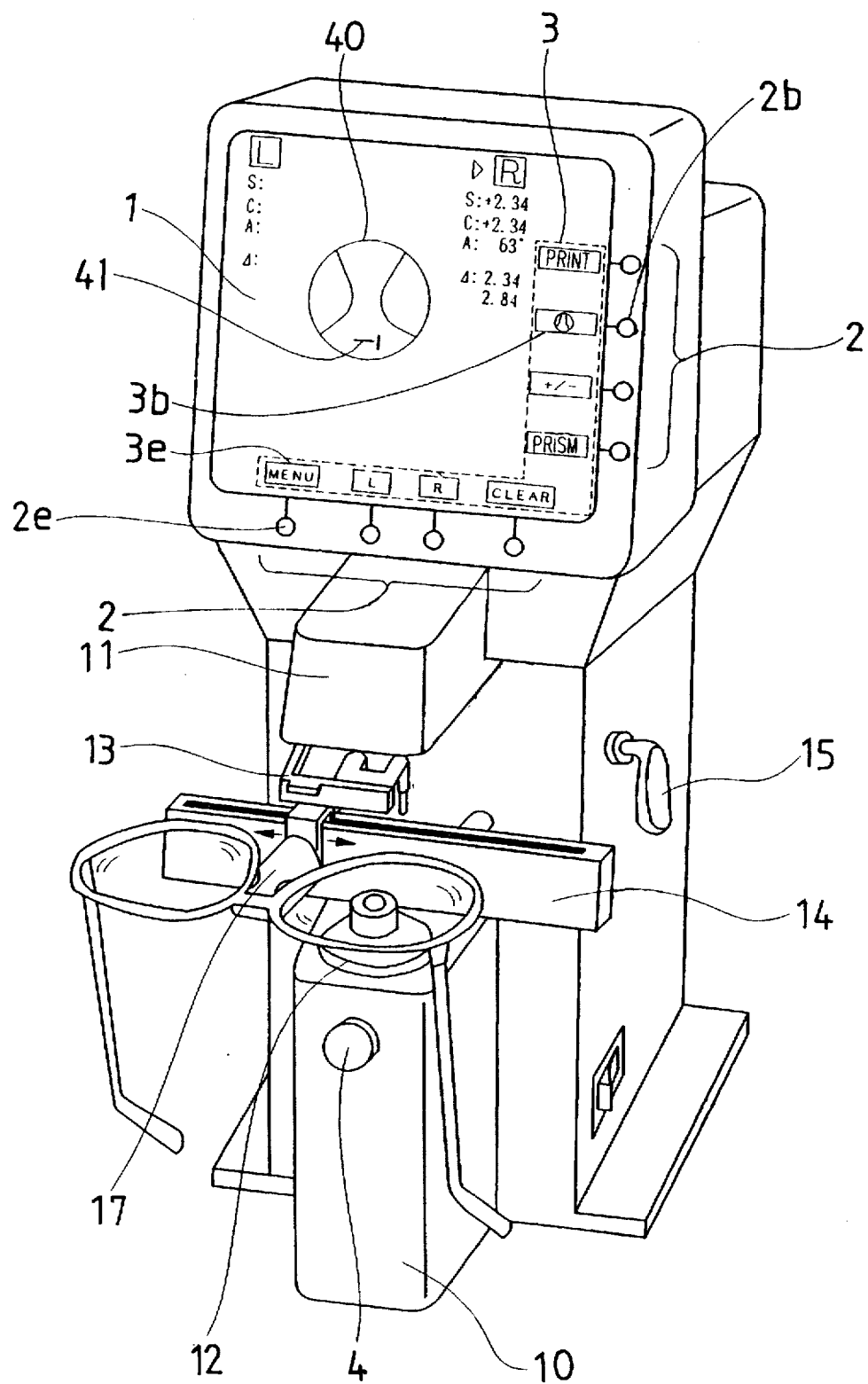
FIG. 1 shows an outer appearance of a lens meter of one preferred embodiment of the present invention.

FIG. 1 shows an outer appearance of a lens meter of the preferred embodiment. Reference numeral 1 denotes a display of LCD and the like for use in displaying various information such as a target, measuring information, a set screen and the like for alignment. Reference numeral 2 denotes a group of switches, wherein a switch corresponding to a switch display 3 displayed at a predetermined position in the display 1 is depressed to enable the device to be operated and various kinds of items to be set. On the switch display 3 at the measuring screen are present various kinds of switch displays such as a right-left selection switch display for selecting each of a right lens or a left lens, a print switch display, a measuring mode changing-over switch display 3b and a menu switch display 3e for setting parameters and the like.

Every time the switch 2b corresponding to the measuring mode change-over switch display 3b is depressed, a mode for measuring a single focus lens and another mode for measuring a progressive focus lens can be selected in sequence and the measuring screen is correspondingly changed over. In addition, when the switch 2e corresponding to the menu switch display 3e is depressed, the contents of the switch display and graphic display of the display 1 can be changed over and then various kinds of settings can be carried out under the operation of the switch group 2.

The lens meter of the present preferred embodiment has a mode in which the width of a progressive section of a progressive focus lens is measured when the progressive focus lens is measured, and when the measurement of the width of the progressive section is to be carried out, the switch 2e corresponding to the menu switch display 3e is depressed and then a selective setting is carried out through a parameter setting screen.

Reference numeral 4 denotes a READ switch fop use in reading and storing measured values.

Reference numerals 10 and 11 denote storing bodies for storing a measuring optical system to be described later, wherein the storing body 10 is provided with a nose piece 12 for mounting a lens and the examined lens is held by lowering a lens fixer 13.

Reference numeral 14 denotes a lens receiver for use in setting a position of the examined lens in its forward or rearward direction, wherein the lens receiver 14 is held in such a manner that it can be moved in a forward or rearward direction in respect to the device. Reference numeral 15 denotes a moving lever for the lens receiver 14.

Reference numeral 17 denotes a nose pad to be abutted against nose pads of a spectacle frame when a framed lens is measured, wherein the nose pad 17 is held in such a manner that it can be moved in the lens receiver 14 in a lateral direction.

Figure 2:
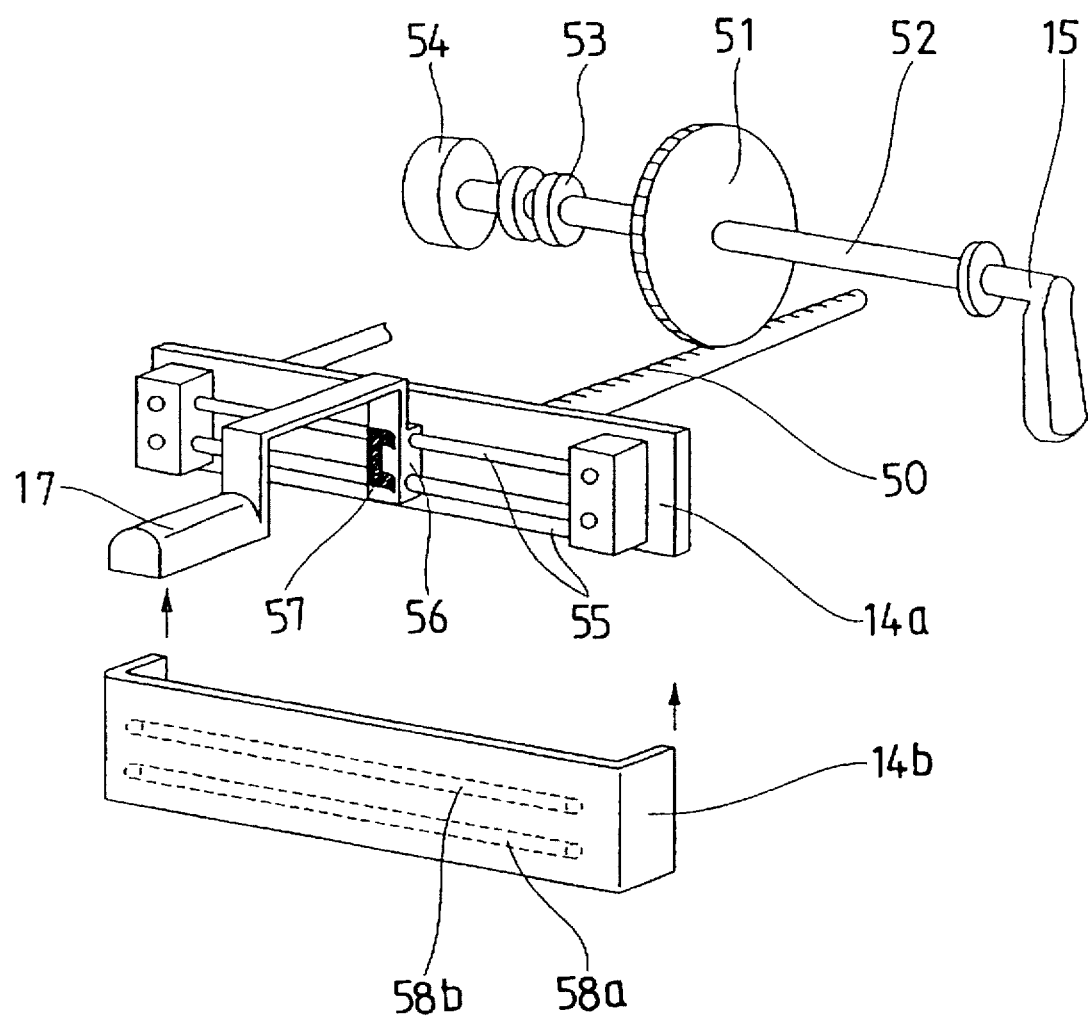
FIG. 2 is a view for illustrating a mechanism for sensing movement positions in the forward or rearward direction and the rightward or leftward direction of a lens to be examined in the lens meter shown in FIG. 1.

FIG. 2 is a view for illustrating a mechanism for sensing the movement positions of the examined lens in the forward or rearward direction and the lateral direction, respectively.

Reference numeral 50 denotes a rack fixed to a rear plate 14a of the lens receiver 14, wherein the rack 50 is held in the device in such a manner that it can be moved in a forward or rearward direction. To the Pack 50 is engaged a pinion 51, and a shaft 52 passes through the pinion 51 and fixed there. To one end of the shaft 52 is fixed a moving lever 15 and to the other end of the shaft 52 is fixed a potentiometer 54 through a flexible coupling 53. Upon rotation of the moving lever 15, the rack 50 is moved in a forward or rearward direction together with the lens receiver 14 under the rotation of the pinion 51 and concurrently the rotation is transferred to the potentiometer 54. With such an arrangement as above, an amount of motion of the lens receiver 14 in the forward or rearward direction is detected by the potentiometer 54.

To the lens receiver rear plate 14a are fixed two rails 55 extending in parallel from each other in a lateral direction through fixing members, wherein the nose pad 17 is engaged with a sliding member 56 movable along the rails 55 and integrally held to it. Reference numeral 14b denotes a lens receiver front plate, wherein at the rear surface are held a linear resistor 58a and an electric conductor 58b. To the sliding member 56 is fixed a brush 57, and the lens receiver front plate 14b is fixed to the lens receiver rear plate 14a in such a manner that one arm of the brush 57 is abutted against the linear resistor 58a and the other arm is abutted against the electric conductor 58b. An amount of lateral motion of the nose pad 17 is detected under a variation of voltage by the sliding motion of the brush 57 on the linear resistor 58a.

Figure 3:
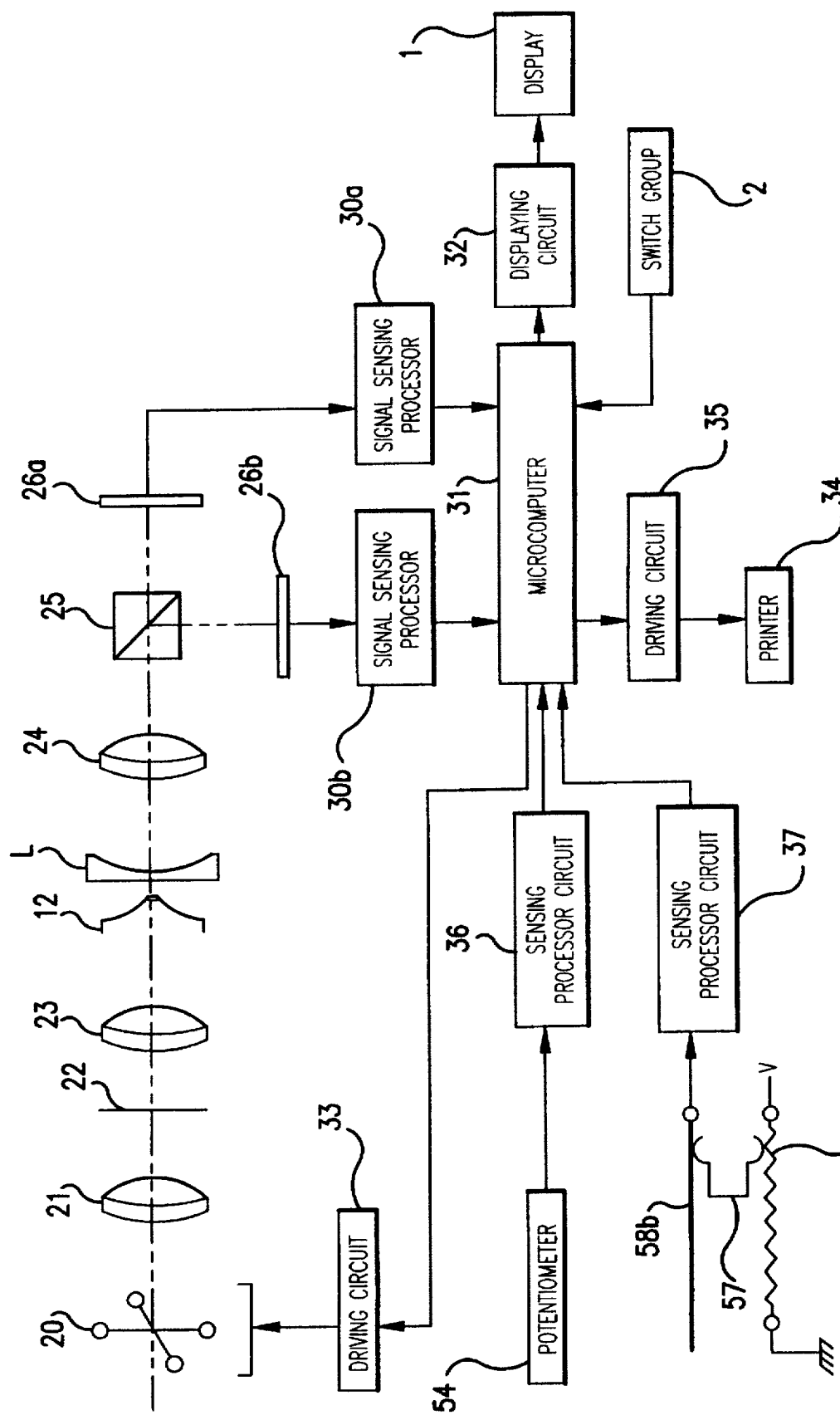
FIG. 3 is a view for illustrating an optical system and a control system of the lens meter of the preferred embodiment.

FIG. 3 is a view for illustrating an optical system and a control system of the lens meter.

Reference numeral 20 denotes measuring light sources for LED and the like, wherein four light sources are arranged near the focal point of a condenser lens 21 while being crossed at a right angle with an optical axis and they are lit up in sequence when the measurement is carried out under control of a microcomputer 31. Reference numeral 22 denotes a measuring target having crossing slits and the target is fixed near the focal point of the condenser lens 21 and a collimating lens 23 or movable. The nose piece is arranged near the focal points of the collimating lens 23 and an image forming lens 24. Reference numeral 25 denotes a half prism, and reference numeral 26a, 26b denotes two one-dimensional image sensors arranged in such a manner that they may be crossed to each other in respect to the optical axis and their sensing directions are crossed to each other.

Light projected from the measuring light sources 20 radiates against the measuring target 22 through the condenser lens 21. Light beam passed through the measuring target 22 is focused on each of the two crossing image sensors 26a, 26b through the collimating lens 23, the examined lens L and the image forming lens 24.

A relation between the refractive power of the examined lens and an image forming position of the measuring target will be described in brief. Each of the measuring light sources 20 is lit in sequence so as to illuminate the measuring target. In the case that the examined lens is not present (or a lens having no refractive power is mounted), all the target images formed on the image sensors 26a, 26b under lit condition of each of the measuring light sources are overlapped from each other. In the case that the examined lens has only a spherical refractive power, a position of the target image on the image sensor 26a, 26b is moved only by the spherical refractivity. In the case that the examined lens has only a cylindrical refractive power, the light beam incident to the lens may apply a refractive power in such a direction crossing with a major diameter line at a right angle (or in the same direction). Accordingly, it is possible to get a spherical degree, an astigmatism degree, an astigmatism axis angle and a prism amount in response to a central coordinate of the target image formed through lighting of each of the measuring light sources 20. Since this calculation process is basically the same as that disclosed in Japanese Patent Laid-Open No. Sho 60-17335 (1985) (with the title of the invention of "Automatic Lens Meter") of the same applicant as that of the present invention, refer to it.

Each of the output signals produced from the image sensors 26a, 26b is processed by a signal sensing processor circuit 30a, 30b, and inputted to the microcomputer 31. The microcomputer 31 applies a predetermined calculating process to get the optical characteristics of the examined lens L.

In addition, a signal on moving information of the lens receiver 14 detected by the potentiometer 54 is processed by a sensing processor circuit 36 and inputted to the microcomputer 31. A voltage signal obtained by sliding the brush 57 on the linear resistor 58a and the electric conductor 58b is processed by the sensing processor circuit 37 and inputted to the microcomputer 31.

Reference numeral 32 denotes a displaying circuit for the display 1 and reference numeral 33 denotes a driving circuit for the measuring light source. Reference numeral 34 denotes a printer and reference numeral 35 denotes its driving circuit.

With such a device having the configuration as described above, its operation will be described as follows.

Measurement of a single focus lens, measurement of a framed progressive focus lens and measurement of the width of a progressive section of a progressive focus lens will be described in sequence.

(A) Measurement of single focus lens

At first, a measuring mode of a single focus lens will be described in brief.

An operator selects a mode for measuring a single focus lens through the switch display 3b and sets a measuring screen to a single focus lens measuring screen.

The microcomputer 31 controls the display circuit 32 and displays a reticle (not shown) of measuring the single focus lens on the display 1. In addition, the microcomputer 31 turns on the four measuring light sources 20 in sequence through the driving circuit 33. When the examined lens having a refractive power is placed on the nose piece 12, its refractive power is calculated and displayed on the display 1, and concurrently an amount of displacement of the examined lens from the optical axis is calculated in reference to the calculated prism value and overlapped on the reticle on the display 1 to display the cross target at a position corresponding to that amount of displacement. The measurement value when the reticle and the cross target have a predetermined relation from each other becomes a measurement value of the examined lens. Upon depression of the READ switch 4, the measurement value is stored.

(B) Measurement of progressive multifocus lens

Then, a measurement of a framed progressive multifocus lens will be described. The operator depresses the switch 2b corresponding to the switch display 3b to select a progressive multifocus lens measuring mode. As shown in FIG. 1, an alignment circle 40 having two curved lines imitating a progressive multifocus lens and a guide 41 are displayed in the screen of the display 1. At both sides of the alignment circle 40 is displayed each of the right and left measurement values, respectively.

Switches in the switch group 2 meaning the selection of right and left lenses are depressed to specify the right or left lens in compliance with the lens to be measured (Since the right and left lenses of the spectacles can be discriminated in reference to the positional signal of the nose pad 17, it may also be applicable that the switch operation for selecting the right or left lens can be eliminated). As shown in FIG. 1, the operator causes the lower side of the lens when the spectacles are worn (the upper and lower positions of the frame and the lens expressed in the specification are meant by the upper and lower orientations under a state in which the spectacles are worn by the user) to be abutted against the lens receiver 14 and concurrently the nose pads of the frame to be abutted against the nose pad 17.

Under this condition, the vertical (forward or rearward in respect to the device) and lateral positional movement adjustments of the spectacle frame are carried out together with the lens receiver 14 and the nose pad 17 in such a manner that a slight upper part of the examined lens to be measured may occupy a location on the nose piece 12 and then the measurement is started.

<Measuring step for far viewing>

Figure 4:
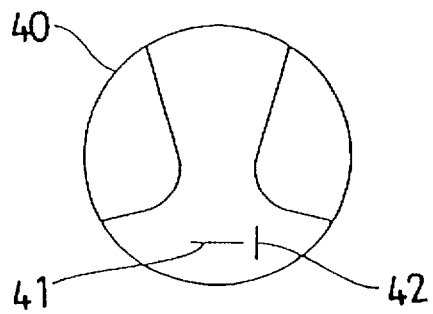
FIGS. 4(a) 4(b), 4(c) 4(d), 4(e) and 4(f) are views for illustrating a displayed state of a display under a measuring mode of a progressive focus lens.
Figure 4:
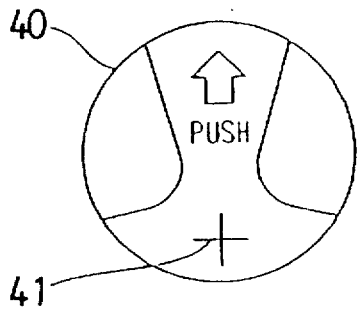
Figure 4:
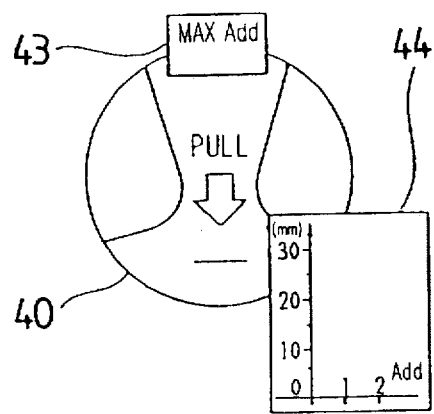
Figure 4:
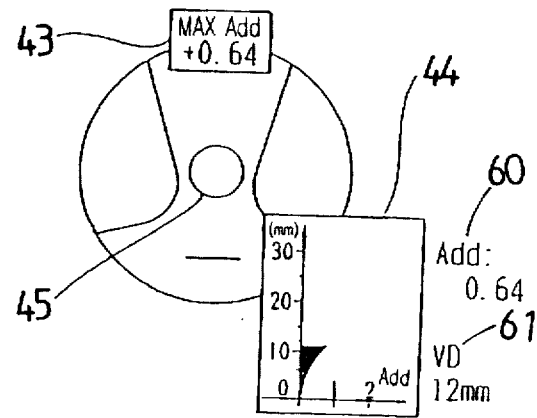
Figure 4:
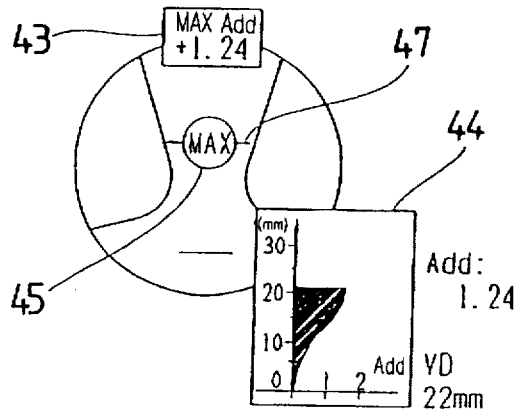
Figure 4:
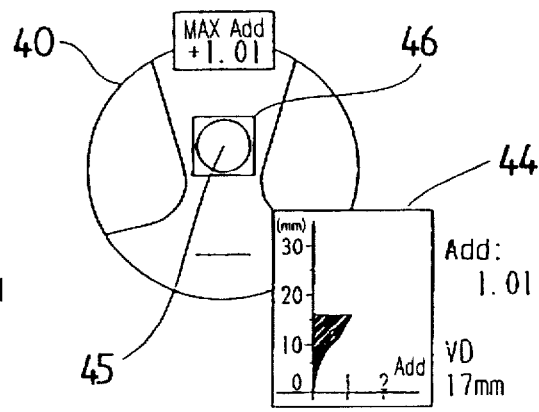

Upon locating the examined lens on the measuring optical axis, a progressive target 42 is displayed on either the right side or the left side of the guide 41 in the alignment circuit 40 on the screen (FIG. 4(a)). The guide 41 indicates a moving target on a reference ordinate line and the position of the progressive target 42 indicates a direction of which the examined lens should be moved. The microcomputer 31 calculates a relative position of the progressive target 42 in respect to the guide 41 as follows in response to the prism value of each of the measuring points. In the case that the examined lens has only a spherical refractive power, the far viewing section in the lens is positioned on an axis where the prism value may become approximately 0, so that the position of the progressive target 42 is controlled through increasing or decreasing of the prism value by lateral motion of the lens. In the case that the examined lens has a cylindrical refractive power, the position where the prism value of the examined lens in the lateral direction becomes 0 is placed on an astigmatism axis, so that an influence caused by the cylindrical refractive power from the prism values at each of the measuring points is corrected by applying a predetermined calculating process so as to perform control over the position of the progressive target 42. As for the correcting process of influence caused by the cylindrical surface refractive power, the description of Japanese Patent Laid-Open No. Hei 6-58842(1994) (with the title of the invention of "Lens Meter and Its Measuring Method") of the same applicant as that of the present invention of U.S. Pat. No. 5,379,111 of "LENS METER" is applied.

The operator moves the lens in the lateral direction in such a manner that the progressive target 42 may approach the center of the guide 41 (this indicates that in FIG. 4(a), the lens is moved in the leftward direction toward the device). When the center of the progressive target 42 is in compliance with the guide 41, a guidance display mark of "PUSH ↑" meaning that the lens is moved toward a deep side in the alignment circle 40 appears (FIG. 4(b)).

The operator moves the lens receiver 14 toward the deep side of the device together with the lens in accordance with the guidance display. The device gets measurement values continuously in a predetermined interval, and with no variation in the additive diopter (spherical degree) upon movement, deletes "PUSH ↑" on the screen, displays the guide 41 in a large cross shape and informs the operator that the measuring point is placed at the far viewing section. Subsequently, upon stabilization of the measurement value for a predetermined period of time (1 second, for example), the device automatically reads in the measurement value at this time and stores it.

<Measuring step for near viewing>

Upon storing the measurement values at the far viewing section, an operation of the device is automatically transferred to a measuring step for the near viewing section. On the screen are displayed a guidance display mark of "PULL ↓" meaning that the lens should be moved toward the operator, a displaying part 43 displaying the maximum value of the additive diopter at the upper part of the alignment circle 40 and an additive diopter graph 44 indicating a state of increasing the additive diopter (FIG. 4(c)). The additive diopter graph 44 has an additive diopter at an abscissa and a distance from an additive diopter starting position at an ordinate.

The operator moves gradually the lens receiver 14 toward the operator together with the lens in accordance with the guidance display. During motion of the lens, the device gets measurement values in a consecutive manner and detects an additive diopter starting position from the variation in additive diopter per unit movement amount. Upon detection of the additive diopter starting position, it gets a signal detected by the potentiometer 54 and the additive diopter starting position is set at the reference position in the forward or rearward direction.

Upon entering of the measuring point in the progressive section, the guidance display of "PULL ↓" disappears, and a corona target 45 appears (FIG. 4(d)). The operator moves the lens and the lens receiver 14 toward the near viewing section. Upon passing of the lens through the progressive section, the corona target 45 moves upward on the alignment circle 40. Determination of the displaying position of the corona target 45 is performed by sensing an amount of motion of the lens receiver 14 with the potentiometer 54 (in a convenient manner, the variation of the prism amount may be determined under its conversion into a moving distance, although a measuring error at the lens of low power may have a high value, so that it is preferable that the moving amount of the lens may be detected directly as found in the preferred embodiment). In addition, the device detects the variation in the astigmatism degree and monitors such that the measuring point may not be shifted at the right and left sides of the progressive section. Upon displacement of the point from the progressive section, the corona target 45 is displayed at a position slightly displaced out of the curved line of the progressive section. Upon displacement of the corona target 45 out of the curved line of the progressive section, the operator corrects the movement in the lateral direction.

Although the measuring point is moved from the progressive section toward the near viewing section, the maximum additive diopter during that process is displayed at the displaying part 43. A state of increasing of that value is displayed at an additive diopter graph 44. At the lateral side of the additive diopter graph 44 are displayed an additive diopter display 60 indicating the additive diopter at the measuring point and a distance 61 ranging from the additive diopter starting position. Since both the distance and the additive diopter are displayed by numerical values, it is possible to understand the optical characteristics in the progressive section even during the measurement.

In addition, the device judges if the additive diopter is maximum in reference to the variation of the additive diopter per amount of movement. In the case that the additive diopter is increased, the displaying of the additive diopter at the displaying part 43 is revised and in the case that the additive diopter is not increased, the additive diopter at that time (i.e. the maximum additive diopter) is held and displayed at the displaying part 43. A MAX bar 47 is hold displayed at a position corresponding to the measuring point where the maximum additive diopter is attained, in response to the value of the potentiometer 54 when the maximum additive diopter is attained (FIG. 4(e)). Accordingly, even if the measuring point passes through the position of the maximum additive diopter, the corona target 45 is returned back again to the position of the MAX bar 47, alignment may easily be attained at the position of the maximum additive diopter (i.e. at the near viewing section) and the accurate measurement can be realized again.

In the case of performing the measurement for the near viewing section, the measurement value when the maximum additive diopter can be attained may be utilized as it is, or the READ switch 4 may be depressed when the corona target 45 and the MAX bar 47 are approximately coincided to each other. The device stores the measurement value at this time in the memory circuit, the additive diopter is held and displayed at the additive diopter display 60 and the distance ranging from the additive diopter starting position is held and displayed at the distance display 61. With such an arrangement as above, the operator can know the type of the lens or the like.

(C) Measurement of progressive section width of progressive multifocus lens

Then, a measurement of the width of a progressive section of a framed progressive multifocus lens will be described as follows.

The operator depresses the switch 2e corresponding to the menu switch display 3e to cause the parameter setting screen to be displayed on the display 1 and further sets to a progressive section width measuring mode for a progressive focus lens under the operation of the switch group 2. After this operation, the screen of the display 1 is set to be a measuring screen for a progressive focus lens.

Measurement of the additive diopter of the progressive focus lens is performed such that the measurement of the far viewing section and the measurement of the near viewing section are carried out in the same manner as that of the foregoing, and it is finished after the maximum additive diopter is obtained and the READ switch 4 is depressed.

<Measurement of progressive section width>

Figure 5:
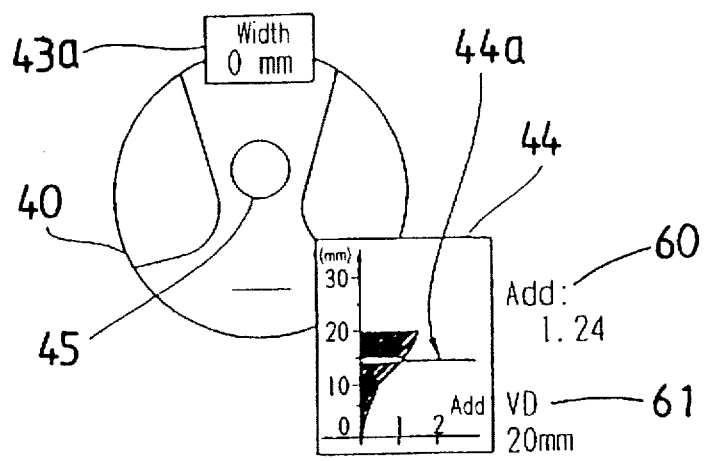
FIGS. 5(a), 5(b) and 5(c) are views for illustrating a displayed state of a display under a measuring mode of the width of a progressive section.
Figure 5:
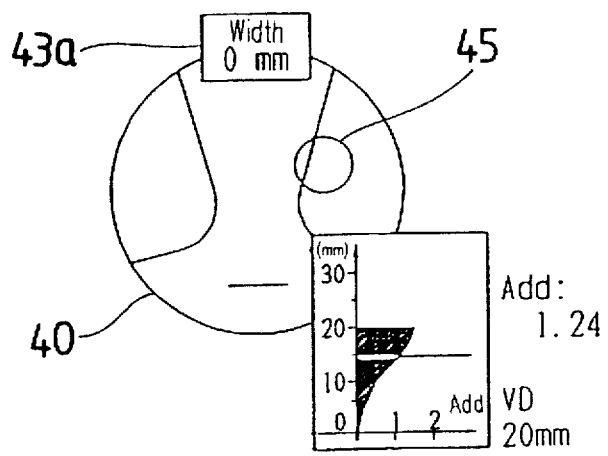
Figure 5:
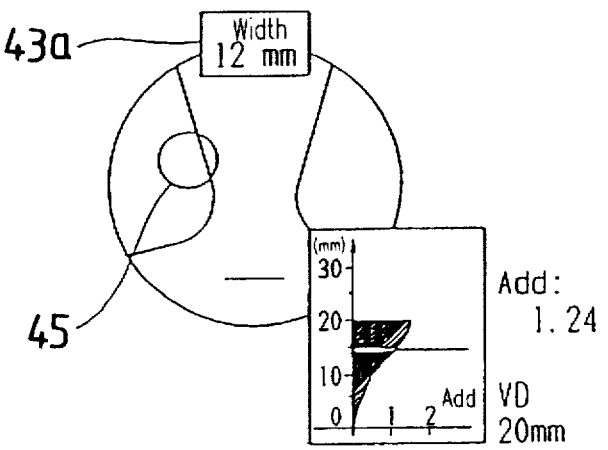

Upon getting a signal indicative of the completion of measurement of the additive diopter, the operation is automatically transferred to the progressive section width measuring mode. The displaying part at the upper portion in the alignment circle 40 is changed from the display indicating the maximum value of the additive diopter to a displaying part 43a for performing a numerical display of the width of the progressive section (FIG. 5(a)). A graph display of the additive diopter graph 44 is hold displayed and further a line display 44a indicating what part of the width of the progressive section is being measured is displayed in response to the position of the measuring point from the additive diopter starting position.

The operator moves the lens together with the lens receiver 14 in reference to the line display 44a in the additive diopter graph 44 and a distance display of the display 61 and sets the vertical position to be measured. Upon setting of the position in the vertical direction, the lens is moved in a rightward direction or a leftward direction together with the nose pad 17 while paying attention to prevent the position of the lens receiver 14 from being changed (the measurement of the progressive section may be started from either the right side or the left side). The device judges whether or not the measuring point is displaced from the progressive section in reference to whether the astigmatism degree of the continuously attained measurement value is changed into a predetermined additive diopter (0.25 D, for example) or not, and when the device judges that the measuring point is displaced from the progressive section, the corona target 45 is displayed at the position displaced from the progressive curved line (FIG. 5(b)). The operator terminates to move the lens at the position where this display appears, and depresses the READ switch 4 to cause a voltage value of the mechanism for sensing a position in the lateral direction to be read and stored in the memory circuit.

Then, the operator moves the lens in the opposite direction while paying attention to the positional displacement of the lens receiver 14. When it is judged that the measuring point is displaced from the progressive section due to the variation of the astigmatism degree, the corona target 45 is displayed at the position displaced from the progressive curved line opposite to the aforesaid direction (FIG. 5(c)). Upon confirmation of it, the operator terminates to move the lens at that position, depresses the READ switch 4 and reads a voltage value of the mechanism for sensing the position in the lateral direction. An amount of movement of the nose pad 17 is obtained in reference to the both detected results of the right and left sides and then the amount of movement is displayed at the displaying part 43a. With such an arrangement as above, the operator can know the width of the progressive section at a desired position.

In the case that it is desired to know the widths of the progressive sections at a plurality of positions in a continuous manner, a similar operation is repeated.

Upon completion of measurement of the right and left lenses, the operator depresses the switch corresponding to the print switch of the display 1 so as to print out the result of measurement. The result of measurement is outputted together with the refractive power at the far viewing section, the additive diopter and further the value of the width of the progressive section outputted together with its measuring point (the distance ranging from the additive diopter starting position, or the distance ranging from the far viewing measuring point).

The present invention may be embodied in other specific forms without departing from the spirit or essential characteristics thereof. For instance, in the aforesaid preferred embodiment, although the distance display 61 displays a distance in a vertical direction with the additive diopter starting position being applied as a reference position, it is also possible to set the reference position to a measuring point for the far viewing section. A changing of the reference position is selected through the setting screen with the menu setting switch. This setting is preferable for measuring a progressive multifocus lens not yet mounted into a frame having marks or the like at each of the positions in the far viewing section and the near viewing section. The measurement in this case is carried out as follows. The mark for the far viewing section in the progressive multifocus lens is placed at the operator's side and the lens is mounted on the nose piece 12 in such a manner that the horizontal reference line set in the lens is in parallel with the lens receiver 14. When the measurement is to be carried out, the lens on the nose piece 12 is always moved together with the lens receiver 14. The lens is moved in such a manner that its center may occupy on a measuring optical axis in accordance with the mark for the far viewing section (during the measurement, the target in the screen may be ignored) and then the READ switch 4 is depressed. The device sets the measuring point at this time as a reference position for displaying a distance and the operation is transferred to the near viewing section measuring step. The operator moves the lens in a direction toward the near viewing section mark. As the lens is moved, the distance of the present measuring point in respect to the far viewing section measuring point is displayed at the display 61 and the additive diopter is displayed at the displaying part 60. Upon judging that the center of the near viewing section mark is approximately coincided with the measuring optical axis, the operator depresses the READ switch 4. At the displaying parts 60 and 61 are displayed the value at this time. In the case that it is desired to know a relation between the additive diopter of the progressive multifocus lens and the distance, the measurement is carried out at the far viewing position, thereafter the measurement is performed down to the near viewing section and then the operator depresses the READ switch 4. Then, the device gets the additive diopter graph 44 expressing a relation between the additive diopter and the distance in response to the measurement value stored in the memory and the lens moving amount in the potentiometer 54. Although the distance in respect to the additive diopter can be understood from the graph, its more clear understanding can be attained if the additive diopter is inputted and its corresponding displacement value is displayed at the distance display 61.

Figure 6A:
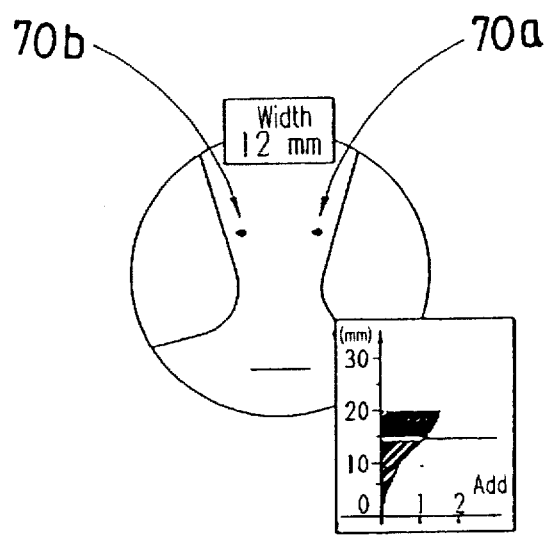
FIGS. 6(a) and 6(b) are views of an example of screen in which the right and left end positions of the progressive section are displayed in plots on an alignment circle of the display.

In addition, under the measuring mode for the width of the progressive section in the aforesaid preferred embodiment, although only the measurement value is displayed, the right end position and the left end position of the progressive section can be displayed in plots on the alignment circle 40 of the display 1 (it can be selected at the menu setting screen). When the reference position is placed on the reference ordinate line and the right and left ends of the progressive section are detected as displacements, they are displayed in plots as a point 70a indicating one end of the progressive section and a point 70b indicating the other point (FIG. 6(a)). The position of the plot point is stored together with the measurement value of the progressive section width displayed at the displaying part 43a.

Figure 6B:
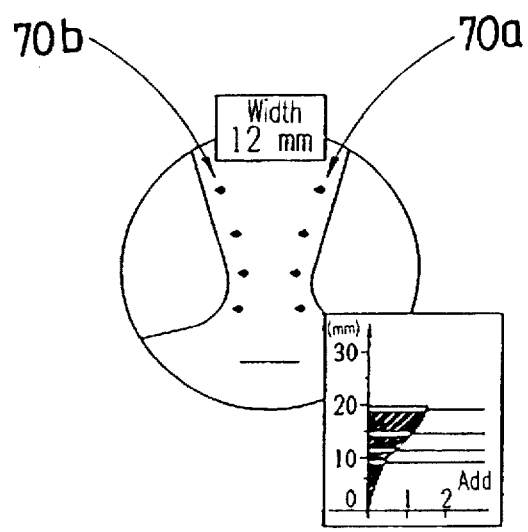

In addition, the aforesaid operation is carried out at a plurality of positions in the vertical direction, thereby a plurality of plot points are displayed on the display 1 (FIG. 6(b)). Accordingly, if the operation is carried out in a suitable interval from the additive diopter starting position to the lens end toward the near viewing part, a distributed state of the progressive section can be understood in a visual manner.

When the print output is carried out, the optical characteristics of the progressive focus lens may easily be understood if the plot points indicating the progressive section ends are displayed together with the graph of the measurement value or the additive diopter.

The foregoing description of the preferred embodiment of the invention has been presented for purposes of illustration and description. It is not intended to be exhaustive or to limit the variations to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A lens meter in which a measuring light flux is projected against a lens to be examined and the optical characteristics of the examined lens are measured in reference to the position of an image formed on a light receiving element by the measuring light flux passed through the examined lens, comprising:

mode changing-over means changing-over to a mode for measuring an additive diopter of a progressive focus lens;

measuring means for continuously measuring a refractive power of the progressive focus lens;

reference position setting means for defining a reference position of the progressive focus lens using measured data of said measuring means to define a starting portion for a progressive zone;

displacement sensing means for sensing a displacement of a measuring point from said reference position; and displaying means for displaying the displacement sensed by said displacement sensing means.

2. A lens meter according to claim 1, further comprising a sensing means for sensing an additive diopter starting position of the progressive focus lens, wherein the reference position defined by said reference position setting means in response to the result of sensing with said sensing means is applied as an additive diopter starting position.

3. A lens meter according to claim 1, wherein the reference position defined by said reference position setting means is selected from a plurality of positions by selecting means.

4. A lens meter according to claim 1, wherein said displacement sensing means is means for sensing a displacement of the progressive focus lens in a vertical direction while the progressive focus lens is being worn.

5. A lens meter according to claim 1, further comprising:

lateral displacement sensing means for sensing a lateral displacement of a measuring point of the progressive focus lens;

sensing means for sensing right and left ends of a progressive section of the progressive focus lens; and progressive section displaying means for displaying the progressive section in response to the results obtained by said sensing means and said lateral displacement sensing means.

6. A lens meter according to claim 5, wherein said progressive section displaying means displays marks at positions corresponding to the right and left ends of the progressive section.

7. A lens meter according to claim 5, wherein said progressive section displaying means displays the width of the progressive section at the measuring point.

8. A lens meter according to claim 5, further comprising:

vertical displacement sensing means for sensing a vertical displacement of a measuring point of the progressive focus lens while the progressive focus lens is being worn; and position displaying means for indicating a measuring point of the progressive section displayed by said progressive section displaying means.

9. A lens meter according to claim 8, wherein the displayed measuring point of the progressive section indicated by said position displaying means is the distance ranging from an additive diopter starting position of the progressive focus lens.

10. A lens meter according to claim 8, wherein the displacement sensed by said vertical displacement sensing means is based on the result of sensing of right and left ends in the progressive section at a plurality of positions in a vertical direction.

11. A lens meter in which a measuring light flux is projected against a lens to be examined and the optical characteristics of the examined lens are measured in reference to the position of an image formed on a light receiving element by the measuring light flux passed through the examined lens, comprising:

measuring mode changing-over means changing-over to a mode measuring an additive diopter of a progressive focus lens;

measuring control mean for continuously measuring a refractive power of the examined lens in a predetermined interval;

lateral displacement sensing means for sensing a lateral displacement of a measuring point of the progressive focus lens;

sensing means for sensing the right and left ends of a progressive section of the progressive focus lens; and progressive section displaying means for displaying the progressive section in response to the results obtained by said sensing means and said lateral displacement sensing means.

12. A lens meter according to claim 11, wherein said progressive section displaying means displays marks at positions corresponding to the right and left ends of the progressive section.

13. A lens meter according to claim 11, wherein said progressive section displaying means displays the width of the progressive section at the measuring point.

14. A lens meter according to claim 11, further comprising:

vertical displacement sensing means for sensing a vertical displacement of a measuring point of the progressive focus lens while the progressive focus lens is being worn; and position displaying means for indicating a measuring point of the progressive section displayed by said progressive section displaying means.

15. A lens meter according to claim 14, wherein the displayed measuring point of the progressive section indicated by said position displaying means is the distance ranging from the additive diopter starting position of the progressive focus lens.

16. A lens meter according to claim 14, wherein the displacement sensed by said vertical displacement sensing means is based on the result of sensing of the right and left ends of the progressive section at a plurality of vertical positions.

* * * * *